United States Patent
Birrer et al.

(10) Patent No.: US 8,426,753 B2
(45) Date of Patent: Apr. 23, 2013

(54) GRAVIMETRIC MEASURING INSTRUMENT WITH RELEASABLE LOAD RECEIVER

(75) Inventors: Adrian Birrer, Winterhur (CH); Andreas Metzger, Männedorf (CH); Thomas Köppel, Oetwil am See (CH)

(73) Assignee: Mettler-Toledo AG, Greifensee (CH)

( * ) Notice: Subject to any disclaimer, the term of this patent is extended or adjusted under 35 U.S.C. 154(b) by 525 days.

(21) Appl. No.: 12/839,512

(22) Filed: Jul. 20, 2010

(65) Prior Publication Data

US 2011/0017521 A1 Jan. 27, 2011

(30) Foreign Application Priority Data

Jul. 23, 2009 (EP) .................................. 09166246

(51) Int. Cl.
*G01G 21/00* (2006.01)
*F16B 35/04* (2006.01)

(52) U.S. Cl.
USPC ........... 177/126; 177/238; 411/411; 411/429; 411/935; 411/935.1

(58) Field of Classification Search ................. 177/126, 177/238, 244, 229; 411/411, 424, 935, 935.1
See application file for complete search history.

(56) References Cited

U.S. PATENT DOCUMENTS

| 3,675,280 | A | * | 7/1972 | Winslade | 411/552 |
| 4,250,600 | A | * | 2/1981 | Gunther | 411/500 |
| 4,442,561 | A | * | 4/1984 | Gunther | 470/12 |
| 4,619,337 | A | * | 10/1986 | Behrend et al. | 177/210 R |
| 4,786,204 | A | * | 11/1988 | Mayeda | 403/374.3 |
| 4,986,376 | A | * | 1/1991 | Cone | 177/128 |
| 5,033,562 | A | * | 7/1991 | Cone | 177/128 |
| 5,716,180 | A | * | 2/1998 | Bowers | 411/551 |
| 5,795,122 | A | * | 8/1998 | Bowers | 411/551 |
| 6,232,567 | B1 | * | 5/2001 | Bonino et al. | 177/210 EM |
| 6,354,159 | B2 | * | 3/2002 | Burkhard et al. | 73/862.637 |
| 7,112,750 | B2 | | 9/2006 | Emery et al. | |
| 2007/0122254 | A1 | * | 5/2007 | LaConte et al. | 411/551 |
| 2008/0314650 | A1 | | 12/2008 | Duppre | |
| 2012/0219379 | A1 | * | 8/2012 | Frens | 411/366.1 |

FOREIGN PATENT DOCUMENTS

| DE | 10107055 A1 | 8/2002 |
| EP | 1576343 B1 | 2/2007 |
| GB | 478369 A | 1/1938 |
| GB | 2055438 A | 3/1981 |

* cited by examiner

*Primary Examiner* — Randy W Gibson
(74) *Attorney, Agent, or Firm* — Standley Law Group LLP

(57) ABSTRACT

A gravimetric measuring instrument that contains a weighing cell having a load-transmitting member. A load receiver can be coupled to the load-transmitting member through a releasable connection. A mechanical stop resides on the load-transmitting member, and a mechanical counter stop resides on the load receiver. By means of an eccentric bolt engaging the load receiver and the load-transmitting member, the mechanical stop can be pressed against the mechanical counter stop, whereby the stop can be clamped tight against the counter stop. With this arrangement, the load receiver can be rigidly but releasably secured to the load-transmitting member.

20 Claims, 5 Drawing Sheets

GRAVIMETRIC MEASURING INSTRUMENT WITH RELEASABLE LOAD RECEIVER

CROSS-REFERENCE TO RELATED APPLICATIONS

This application is entitled to, and claims, benefit of a right of priority under 35 USC §119 from European patent application 09166246.0, filed on 23 Jul. 2009, the content of which is incorporated by reference as if fully recited herein.

TECHNICAL FIELD

The present invention is directed to a gravimetric measuring instrument with a weighing cell that includes a load-transmitting member. A load receiver may be releasably connected to the load-transmitting member.

BACKGROUND

Gravimetric measuring instruments like those of interest here may serve, for example, as balances and weighing modules in many areas of industry, particularly in laboratories of research and development departments, but also as weighing modules in production departments, for example in quality control. Weighing modules, as used herein, are balances in which the display and/or the data entry unit is arranged separately from the weighing cell and the weighing cell housing.

In EP 1 576 343 B1, a weighing module with a weighing cell is illustrated schematically in a sectional view. The load-transmitting member that is arranged in the load-receiving area of the weighing cell is, at its free end, configured in the shape of a truncated cone. The load receiver shown in this reference has a conical bore that conforms to this frusto-conically shaped free end. Normally, the truncated cones used for this kind of releasable connection have a small taper angle, so that even under an eccentric load the load receiver will not tip over and fall off the load-transmitting member. However, due to this small taper angle, extremely large levels of contact pressure or bearing stress occur in the areas of the contact surfaces. This type of connection is therefore only suitable for balances with small load capacities, even if the connection is made of metal. Furthermore, this type of connection can only be used if a defined orientation of the load receiver—other than a defined position of its mass center of gravity—in relation to the weighing cell is of no importance, i.e. only for rotationally symmetric load receivers or weighing pans.

Based on the foregoing issues, this type of connection is in most cases not suitable for weighing modules in industrial applications. In industrial applications, the load receiver is instead normally screwed onto the load-transmitting member. This connection method has the disadvantage that the installation and removal of the load receiver are very time-consuming, as the entire load receiver has to be turned in relation to the weighing cell. This presents a problem particularly if application-specific devices, such as for example conveyor belts, clamping devices for containers and the like, are attached to the load receiver and the spatial dimensions are so tight that these application-specific devices have to be removed first from the load receiver before the latter can be unscrewed from the load-transmitting member. Weighing modules with application-specific devices are often used in filling and checking devices of production systems for the apportioning and checking of bulk products. Such systems are in many cases designed with multiple tracks, so that a plurality of weighing modules as well as their in-going and out-going conveyor devices are arranged in parallel within a very confined space.

According to a further variant within the state of the art, the load receiver or the weighing pan is attached to the load-transmitting member by means of a screw, which is arranged along the central longitudinal axis of the load receiver and the load-transmitting member. While this allows the load receiver to be disconnected more easily from the load-transmitting member (i.e., without having to turn the entire load receiver), the hole for the screw creates a leak point in the load receiver that needs to be sealed. Such screw connections are also in many cases highly undesirable because of sanitary and cleaning concerns, as the screw is arranged on a horizontal surface and contaminants may accumulate around the screw head. It is self-evident, especially in order to meet the stringent requirements regarding the cleanliness of such production systems, for example in the food and pharmaceutical industries, that the ability to quickly install and uninstall the load receiver for cleaning is of the utmost importance.

The present invention is therefore directed to a gravimetric measuring instrument with a weighing cell that allows a load receiver to be attached to and removed from the load-transmitting member of the weighing cell in a quick and simple manner.

SUMMARY OF THE GENERAL INVENTIVE CONCEPT

A gravimetric measuring instrument of the present invention includes a weighing cell with a load-transmitting member. A load receiver may be connected to the load-transmitting member through a releasable connection. A mechanical stop resides on the load-transmitting member, and a mechanical counter stop resides on the load receiver. By means of an eccentric bolt engaging the load receiver and the load-transmitting member, the mechanical stop can be clamped against the mechanical counter stop, whereby the stop can be pre-tensioned against the mechanical counter stop. With this arrangement, the load receiver can be rigidly secured to the load-transmitting member.

Instead of requiring many turns of a screw or of the entire load receiver, the load receiver such an instrument can be rigidly attached to the load-transmitting member by simply setting the load receiver onto the load-transmitting member, inserting the eccentric bolt and then turning the latter by less than 360°.

In one exemplary embodiment of the present invention, when the load receiver is firmly secured in place, the mechanical stop and the mechanical counter stop are oriented along a plane that is perpendicular to the direction of the load. The term "direction of the load" means in this case the direction of the largest force acting on the load receiver. This is normally the direction of gravity. As a result, the position of the load receiver in relation to the weighing cell, or relative to the surroundings of the gravimetric measuring instrument, is always exactly defined in reference to the vertical direction. Furthermore, this arrangement of the mechanical stop and mechanical counter stop makes it possible to use flat, planar contact surfaces that have a very high load-supporting capacity in comparison to the aforementioned conical connection. Also, this load-supporting capacity is not reduced by the tightening force of the eccentric bolt, as the weight forces acting on the load receiver work in the same direction as the tightening force that acts against the stop contact surfaces and whose direction is determined by the orientation of the stop contact surfaces. When a load is placed on the load receiver, the tightening force is reduced, and therefore the placing of a load on the load receiver cannot cause an overload stress on the stop surfaces.

The eccentric bolt preferably has at least one bearing section and at least one eccentric cylinder. The bearing section is preferably also configured cylindrically. Furthermore, the eccentric cylinder is arranged with a defined eccentricity relative to the bearing section.

In a further exemplary embodiment, when the load receiver is firmly secured in place, the respective central longitudinal axes of the load-transmitting member and of the bearing section intersect at a right angle. This leads to a uniform stress distribution within the connection, which contributes to a further increase of the load-supporting capacity.

Preferably, the load-transmitting member has at least a first bore hole to receive the eccentric cylinder, and the load receiver has at least a second bore hole to receive the bearing section. In order to allow a tightening force to be produced with the eccentric bolt, the distance between the mechanical counter stop and the central longitudinal axis of the second bore hole should be smaller than the result of the sum of the spacing between the stop and the central longitudinal axis of the first bore hole, the amount of eccentricity, and the radius of the eccentric cylinder, minus the radius of the first bore hole. The respective amounts of eccentricity, the distance, the spacing and the diameters of the bore holes, as well as of the bearing section and of the eccentric cylinder, should be matched to the elasticity and the ductility of the materials that are in engagement with each other, so that when the eccentric bolt is seated in the bore holes, it is prevented from turning beyond the dead center of the eccentric bolt and causing a loss of tightening force. "Dead center" in this context refers to that position of the eccentric bolt in which the strongest tightening force can be generated. This means that the respective central longitudinal axes of the second bore hole, the first bore hole and the eccentric cylinder are aligned in the same plane and parallel to each other.

Furthermore, it is in most cases desirable for the eccentric bolt to be self-jamming when the load receiver is secured in place, so that the eccentric bolt cannot turn in the bore holes as a result of forces or vibrations acting on the load receiver, which could lead to a separation of the load receiver from the load-transmitting member and could cause damage to the gravimetric measuring instrument. This self-jamming behavior may be achieved, for example, by selecting the eccentricity (corrected by a leverage ratio) to be smaller than the product of the coefficient of friction which exists between the eccentric cylinder and the first bore hole multiplied by the radius of the eccentric cylinder. The coefficient of friction depends on the materials and the surface properties of the eccentric bolt and the load-transmitting member. The leverage ratio in the secured state of the load receiver depends on the position of the eccentric cylinder within the first bore hole. Of course, friction forces that enhance the self-jamming behavior are also present between the bearing section and the second bore hole.

The precision of the weighing results produced by weighing cells of the known state of the art is more or less strongly influenced by temperature changes. Especially in the primary areas of application of the present invention, objects to be weighed can themselves have vastly different temperatures at the time they are placed on the load receiver. To prevent the propagation of heat from the load receiver to the weighing cell, the load-transmitting member can contain a material of low thermal conductivity. Consequently, a part of the load-transmitting member may be made of a polymer or a ceramic material.

A further problem area in gravimetric measuring instruments concerns differences between the electrical potentials of different parts. For example, due to a build-up of electrostatic charges, it is possible for the load receiver to be attracted by the other parts of the gravimetric measuring instrument, which can likewise cause a considerable deviation of the measured value from the actual weight value of an object being weighed. In order to avoid a build-up of electrostatic charges on the load receiver, the weighing cell and the load receiver are preferably made of electrically conductive material, and an electrically conductive connection, for example a contact spring, is arranged between the weighing cell and the load receiver. This arrangement provides assurance that the housing of the gravimetric measuring instrument, the weighing cell arranged in the instrument, and the load receiver are at substantially the same electrical potential.

However, a gravimetric measuring instrument with this kind of direct electrical continuity with the load receiver can be very susceptible to electromagnetic disturbances from the environment, as the load receiver works like an antenna. Surprisingly, it has been found that contact springs in the form of compressive or tensile helix springs are particularly well suited to minimize these influences. The more windings such a spring has, the larger is its damping effect in regard to the transmission of electromagnetic disturbances into the weighing cell and the electrical and electromagnetic components of the weighing cell. Thus, the greater the length of the part of low thermal conductivity and the greater the number of windings of the contact spring, the better is the possibility of minimizing the effects that the aforementioned ambient influence factors may have on the weighing cell.

A gravimetric measuring instrument of the present invention (i.e., a balance or weighing module) may be built according to a conventional design. This means that a weighing cell is arranged inside a housing. The housing has a pass-through opening through which the load-transmitting member that is connected to the weighing cell reaches to the outside. Depending on where the equipment is used, the housing may have to meet certain sealing requirements to prevent dust and/or moisture from penetrating into the weighing cell. As the load receiver and the housing cannot be allowed to touch each other, there is preferably a contact-free sealing system arranged between the housing and the load receiver. Such a sealing system can have the form of a labyrinth baffle seal, as disclosed for example in EP 1 576 343 B1.

The load-transmitting member may further be equipped with an overload protection device. Such a device may include a spring element whose spring force is slightly larger than the weight force of the maximum weighing load that can be placed on the load receiver. As soon as this spring force is exceeded, the load-transmitting member that is arranged between the weighing cell and the load receiver collapses to a shorter height, and the load receiver comes to rest on the housing so that the forces acting on the load receiver are supported directly by the housing.

The load receiver preferably has a flat, planar surface so that it can be cleaned easily and to provide a stable support to objects being weighed. A planar surface further facilitates the installation of application-specific devices. The latter can, for example, be clamped to the load receiver by means of suitable clamping devices. Of course, there can also be at least one prepared mounting location formed on the load receiver (e.g., a bore hole which can also include a screw thread) for the attachment of application-specific devices.

As described above, the respective central longitudinal axis of the bearing section or of the eccentric bolt can be arranged at a right angle to the central longitudinal axis of the load-transmitting member. To allow the eccentric bolt to be set in place, a lateral bore hole is placed in the load receiver, which hole may in some cases have to be sealed to prevent dirt accumulation therein and/or to prevent dirt and liquids from possibly penetrating into the interior of the housing. However, the use of a seal can make it difficult to remove the eccentric bolt when taking off the load receiver. This problem is preferably solved with an elastic ejector element by way of which the eccentric bolt is pushed at least partially out of the bore holes when the securing connection of the load receiver is being released. Preferred elastic ejector elements include, for example, helical compression springs, rubber elements, gas cylinders and the like.

In principle, the mechanical stop and the mechanical counter stop can be configured as flat, planar surfaces that oppose each other. As a result of the tightening force, the mechanical stop is pressed against the mechanical counter stop. Under a sufficient tightening force, the friction force between the stops prevents the load receiver from moving in any horizontal direction, even if horizontal forces are acting on the load receiver. However, to facilitate the process of connecting the load receiver to the load-transmitting member and to allow in particular a precise, predetermined alignment between the two parts, the load receiver and the load-transmitting member can have form-locking positioning elements. Suitable to perform this function are projections, pins and bore holes, collars, sleeves, contours with bevels, and the like.

BRIEF DESCRIPTION OF THE DRAWINGS

Gravimetric measuring instruments of the present invention and their attachment to a load receiver will be described in more detail in conjunction with the following illustrations, wherein elements that are identical from one drawing to the next are identified by the same reference symbols, and wherein.

DETAILED DESCRIPTION OF EXEMPLARY EMBODIMENT(S)

Figure 1:
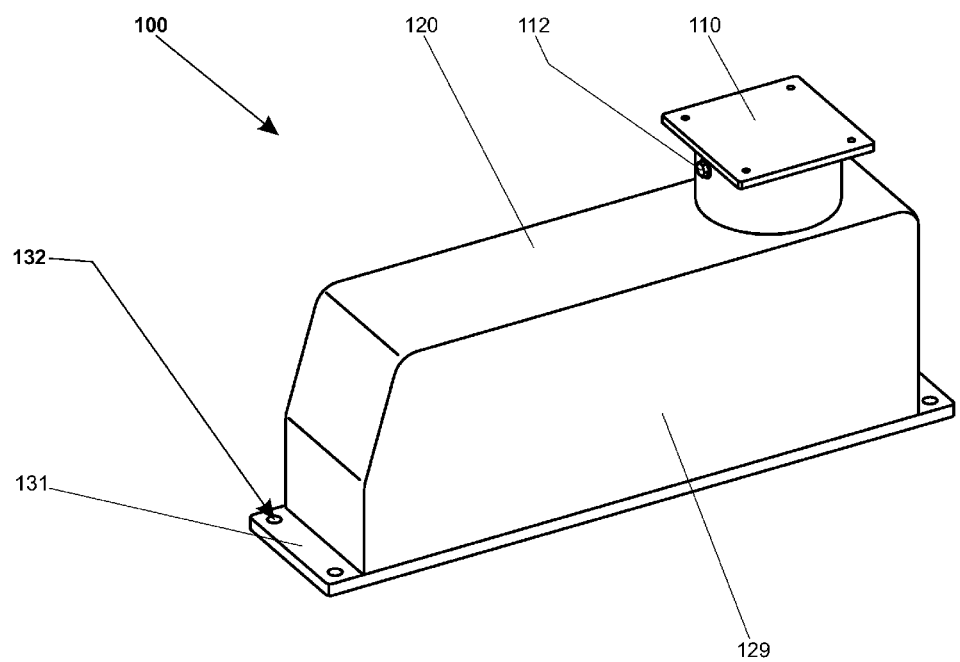
FIG. 1 represents a three-dimensional view of an exemplary gravimetric measuring instrument in the form of a weighing module with a load receiver secured in place.

FIG. 1 is a three-dimensional representation of an exemplary gravimetric measuring instrument 100 in the form of a weighing module 120 with a load receiver 110 secured in place. The weighing module 120 includes a base plate 131 and a housing 129 that is releasably connected to the base plate 131. A weighing cell (not shown here) is arranged inside the housing 129. The base plate 131 has fastening locations 132, so that the weighing module 120 can be installed for example in a multi-track weighing system. The load receiver 110 is rigidly secured on a load-transmitting member (likewise not shown here) by means of an eccentric bolt 112.

Figure 2:
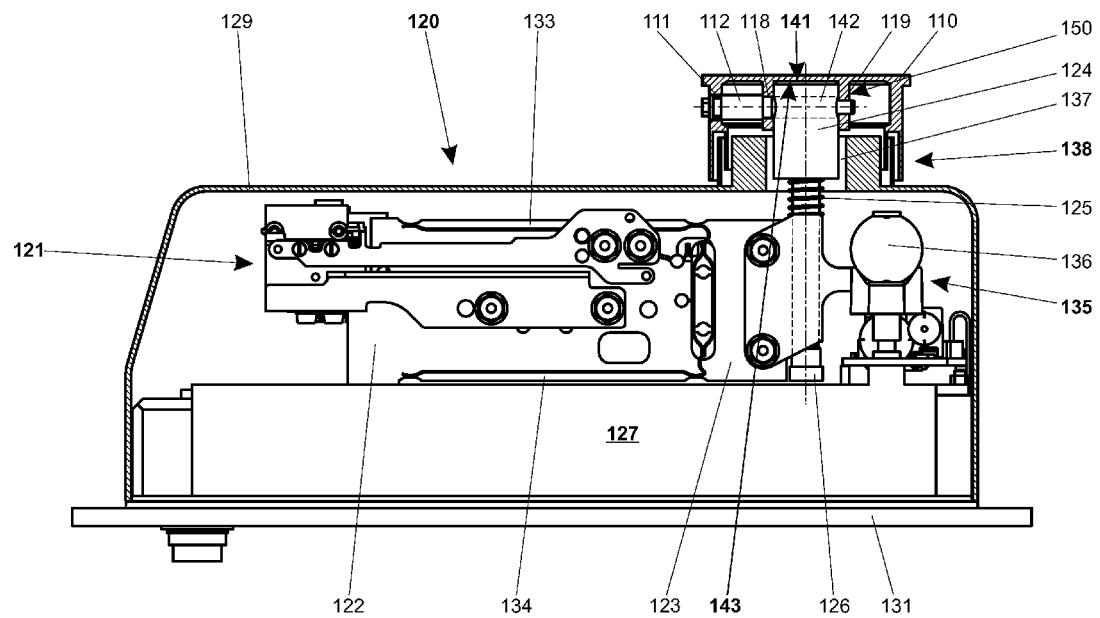
FIG. 2 is a sectional view of the weighing module of FIG. 1, as seen from one side.

FIG. 2 depicts the weighing module 120 of FIG. 1 in a side view, wherein the housing 129 and the load receiver 110 are shown in cross-section. Arranged inside the housing 129 is a weighing cell 121 with a parallel-guiding mechanism. The parallel-guiding mechanism has a stationary parallel leg 122 and a movable parallel leg 123, wherein the movable parallel leg 123 is connected to the stationary parallel leg 122 by means of two parallel-guiding members 133, 134. The stationary parallel leg 122 is fixed to the base plate by way of an intermediate support 127.

Also arranged on the intermediate support 127 is a calibration device 135 whose calibration weight 136 can be brought into operating engagement with the movable parallel leg 123.

The movable parallel leg 123 is connected to a load-transmitting member 124. This connection is not rigid. Rather, the load-transmitting member 124 is tied to the movable parallel leg 123 with linear vertical mobility and has an overload safety stop 126. In addition, there is an overload safety spring 125 arranged between the load-transmitting member 124 and the movable parallel leg 123. The spring force of the overload safety spring 125 is slightly larger than the stated maximum load capacity of the load receiver 110. As soon as a larger load is placed on the load receiver 110, the overload safety spring 125 will compress, and the overload safety stop 126 will move into supporting contact with the intermediate support 127. This overload safety device serves to prevent mechanical destruction of the weighing cell 121.

The load-transmitting member 124 reaches through a passage 137 in the housing 129, so that the load receiver 110 can be attached to the end of the load-transmitting member 124 that faces away from the weighing cell 121. As the cross-sectional view of the load receiver 110 and the housing 129 illustrates, the area between the load receiver 110 and the housing 129 is configured as a labyrinth baffle seal 138, which is composed of several concentric ring elements that surround the load-transmitting member and are alternatingly arranged on the load receiver 110 and on the housing 129. The load receiver 110 includes a positioning element 150 configured as a ring, which embraces the load-transmitting member 124 with a close fit. While the positioning element 150 is not a necessity, it makes the installation and alignment of the load receiver 110 on the load-transmitting member 124 considerably easier.

FIG. 2 further shows the eccentric bolt 112 seated in bore holes 111, 118, 119, 142 that are formed in the load receiver 110 and the load-transmitting member 124. Each of the bore holes has a specific function. The first bore hole 142, which is formed in the load-transmitting member 124, serves as a force-transmitting contact area for the eccentric bolt 112, more specifically for an eccentric cylinder 115 portion of the eccentric bolt 112 (described in the context of FIG. 3). The second bore hole 118 and the fourth bore hole 119, which are formed on the load receiver 110, and more specifically in the positioning element 150, also serve as force-transmitting contact areas for the eccentric bolt 112. More specifically, the second and fourth bore holes 118, 119 serve as seats for the bearing sections 116, 117 of the eccentric bolt 112, described in the context of FIG. 3. However, there could also be only a second bore hole 118 for use with an eccentric bolt having only one bearing section. The load receiver 110 further has a third bore hole 111, which is required to permit an eccentric bolt 112 to be set in place and tightened by means of a turn about its central longitudinal axis. The tightening occurs because, by turning the eccentric bolt 112 after it has been set into the bore holes 111, 118, 119, 142, the first bore hole 142 is moved away from the second bore hole 118, so that a mechanical stop 141 formed on the load-transmitting member 124 is pushed against a mechanical counter stop 143 formed on the load receiver 110.

Due to the presence of the third bore hole 111, the eccentric bolt 112 remains always accessible from the outside. Furthermore, the cylindrical wall of the third bore hole 111 serves as sealing surface of an elastic seal 153 (shown in FIG. 3), so that no dirt or liquids can penetrate into the labyrinth baffle seal 138 along this path.

Figure 3:
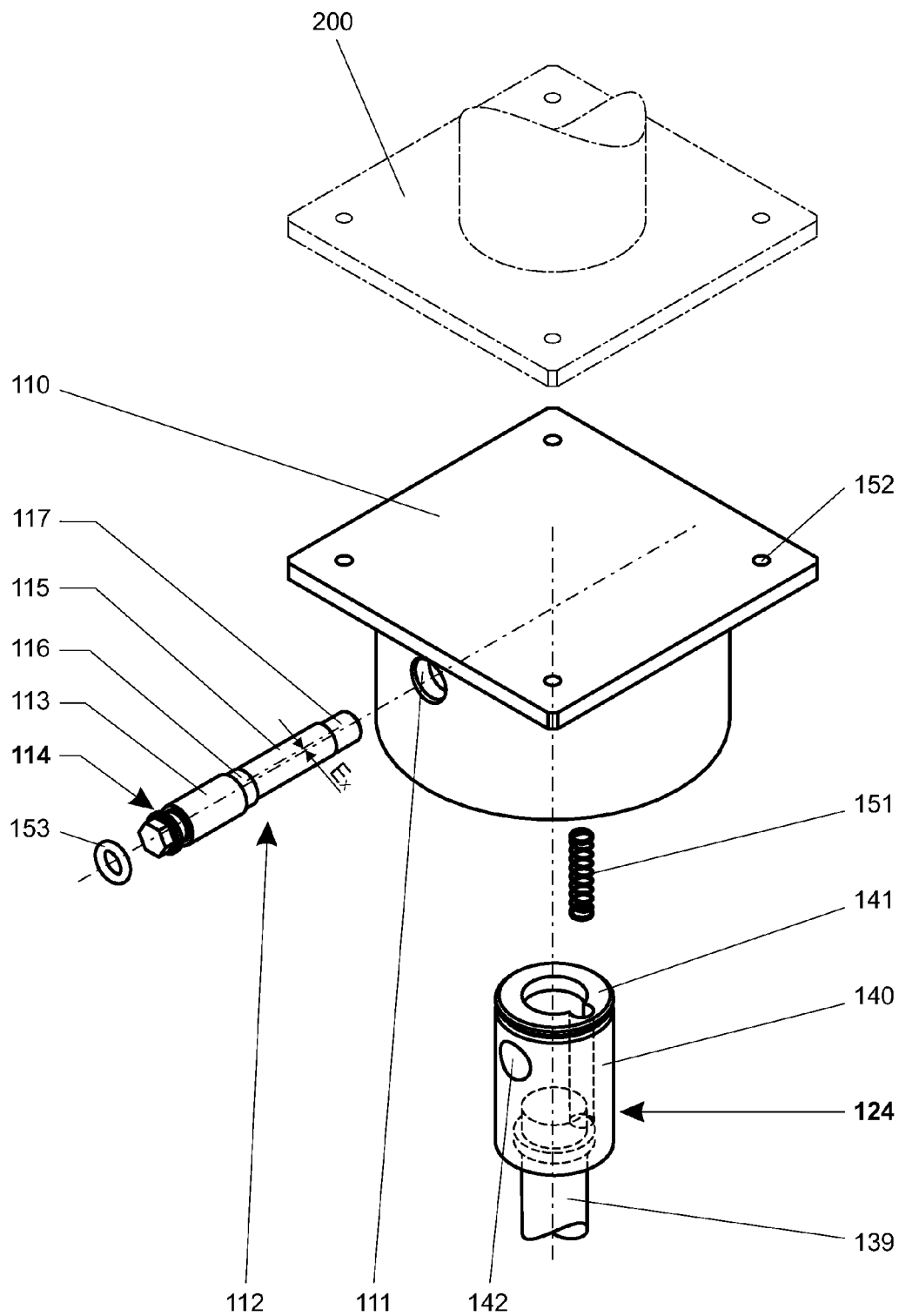
FIG. 3 is a three-dimensional exploded view of the load receiver, an eccentric bolt, and part of a load-transmitting member shown in FIG. 2.

FIG. 3 is a three-dimensional exploded view of the load receiver 110, the eccentric bolt 112 and a part of the load-transmitting member 124. This particular load receiver 110 has four mounting locations 152 where application-specific devices 200 can be fastened, such as for example special holders for containers, conveyor belts and the like. As the design of these adapters is matched to the specific operating situation of the weighing modules and therefore varies from case to case, the application-specific device 200 is drawn with dash-dotted lines to indicate its exemplary construction.

FIG. 3 also illustrates an advantage afforded by the fastening arrangement according to the present invention. That is, the application-specific device 200 can be attached to the load receiver 110 while the latter is separated from the weighing cell. The weighing cell can thus be protected from forces produced during this assembly step. Next, the load receiver 110 together with the application-specific device 200 may be connected to the load-transmitting member 124 by means of the eccentric bolt 112 in the manner described above. Of course, the connection-specific elements of the load receiver 110 could also be formed directly on the application-specific device 200.

The load receiver 110 further contains the third bore hole 111 (already been described in the context of FIG. 2), as well as the second and fourth bore holes (not visible here). The load-transmitting member 124 preferably contains a rod 139 made of a metal and attached to the rod 139 through a form-locking connection. The head 140 is preferably made of a heat-insulating material, for example a ceramic or polymer. The first bore hole 142 is formed in the head 140. When a heat-insulating head 140 is used, the load-transmitting member 124 preferably includes a material of low thermal conductivity so that the load receiver 110 is thermally separated from the weighing cell. However, as previously discussed, the load receiver 110 should be nonetheless electrically connected to the weighing cell. To this end, a contact spring 151 is arranged within the confines of the head 140. Also apparent in FIG. 3 is the mechanical stop 141 in the form of a flat, ring-shaped surface area.

The eccentric bolt 112 is configured essentially in the shape of a rod, wherein a first bearing section 116, a second bearing section 117, a seal ring groove 114 for an elastic seal 153, and an intermediate part 113 are arranged on a common central longitudinal axis. The rod section 115 between the first bearing section 116 and the second bearing section 117 is configured as an eccentric cylinder whose central longitudinal axis runs parallel to the central longitudinal axis of the bearing sections 116, 117, but is offset from the latter by the amount $E_x$ of the eccentricity.

Figure 4:
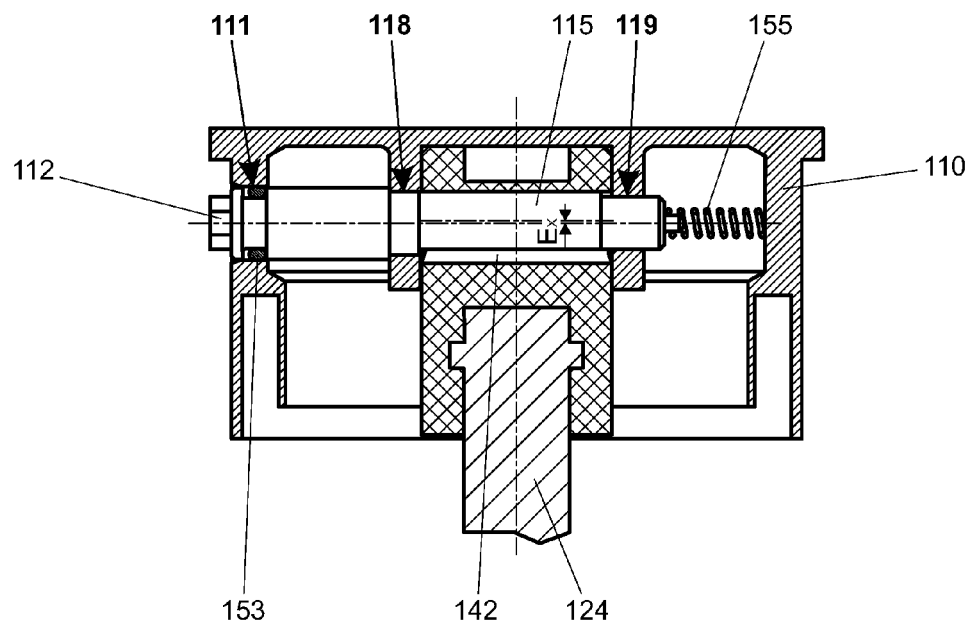
FIG. 4 is a sectional view of the load receiver of FIG. 3 as seen from one side, wherein the central longitudinal axes of the eccentric bolt and the load-transmitting member lie in the sectional plane.

FIG. 4 shows, in cross-section, the load receiver 110 of FIG. 3 seated and secured on the load-transmitting member 124, as shown, the respective central longitudinal axes of the eccentric bolt 112 and of the load-transmitting member 124 lie in the sectional plane. Clearly evident in FIG. 4 is the arrangement of the eccentric bolt 112 and its eccentric cylinder 115, as well as the eccentricity $E_x$ of the latter from the central longitudinal axis of the eccentric bolt 112. The eccentric bolt 112 traverses the third bore hole 111, the second bore hole 118, the fourth bore hole 119 and the first bore hole 142. The bore holes 111, 118, 119, 142 have progressively stepped-down diameters, so that the eccentric bolt 112 can be inserted without a problem.

Also visible is the elastic seal 153, which is shown in its installed position in the third bore hole 111. Because of the necessary compressive fit of the elastic seal 153, it is possible that during disassembly the eccentric bolt 112 may be difficult to remove from the bore holes 111, 118, 119, 142. In order to facilitate the disassembly process, the eccentric bolt 112 can have a compressive helix spring serving as ejector element 155. Preferably, the spring force of the ejector element 155 is large enough to overcome any friction force caused by the elastic seal 153, so that after the eccentric bolt 112 has been loosened by turning it about its central longitudinal axis, it will be pushed out of the bore holes 111, 118, 119, 142 by the ejector element 155.

Figure 5:
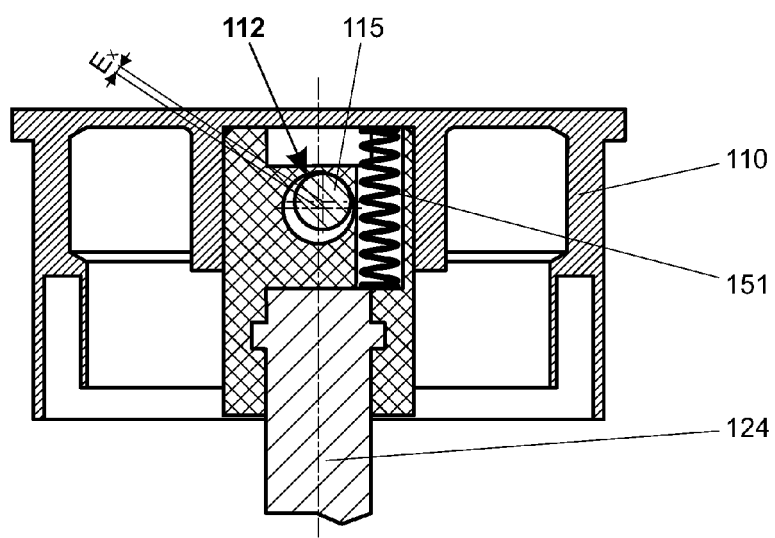
FIG. 5 is a sectional view of the load receiver of FIG. 3 as seen from one side, wherein the central longitudinal axis of the load-transmitting member lies in the sectional plane and is orthogonal to the central longitudinal axis of the eccentric bolt.

FIG. 5 again shows the load receiver 110 of FIG. 3 in a sectional view from the side, wherein the central longitudinal axis of the load-transmitting member 124 lies in the sectional plane and extends at right angles to the central longitudinal axis of the eccentric bolt 112. Also clearly evident here is the position of the eccentric cylinder 115 in its tightened state. In order to prevent a faulty installation of the load receiver 110, the eccentricity $E_x$ is selected to be large enough (including an allowance for the respective amounts of elasticity of the load receiver 110, the eccentric bolt 112 and the load-transmitting member 124) so that the eccentric bolt 112 can never be turned by a full 360°. Also shown in FIG. 5 is the contact spring 151, which provides an electrical connection with a strong damping effect in regard to the transmission of electromagnetic disturbances into the weighing cell.

Figure 6:
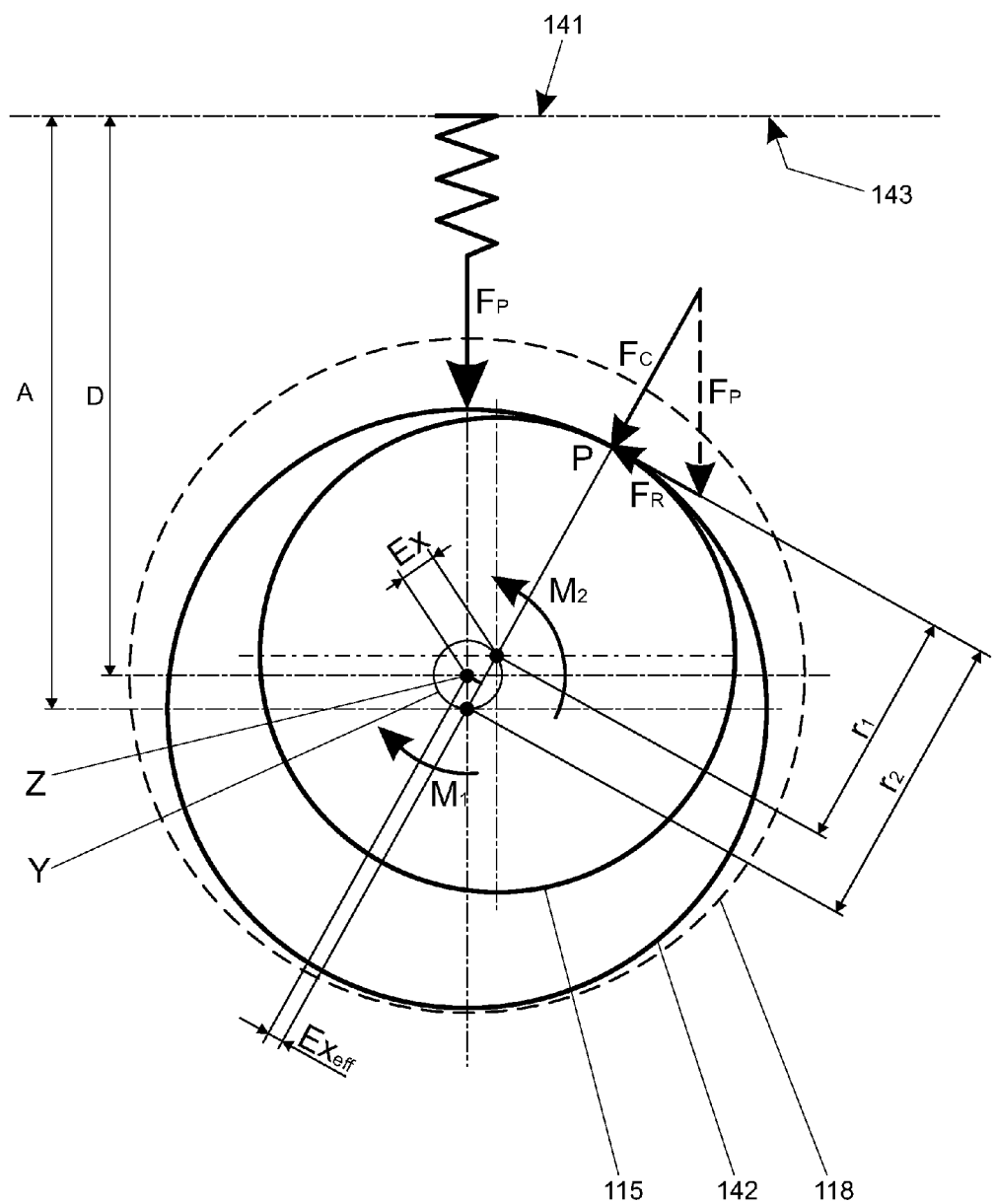
FIG. 6 schematically represents the eccentric cylinder and a first bore hole in a securely tightened condition, as well as the primary forces that occur as a result of tightening the connection.

FIG. 6 schematically represents the eccentric cylinder 115 and the first bore hole 142 in a tightened and thus secured condition, as well as the primary forces that occur as a result of the secured connection. For the orientation of the viewer, the second bore hole 118 is indicated by a broken line at whose center Z the central longitudinal axis of the eccentric bolt extends at a right angle to the plane of the drawing. This central longitudinal axis is at the same time the axis of rotation of the eccentric bolt and thus also of the eccentric cylinder 115. By turning the eccentric bolt 112 counterclockwise about its central longitudinal axis, the central longitudinal axis of the eccentric cylinder 115, which is offset by the eccentricity $E_x$, is moved along a circular path Y and essentially against the direction of gravity. Accordingly, the first bore hole 142 is moved relative to the second bore hole 118 against the direction of gravity until the mechanical stop 141 rests against the mechanical counter stop 143 as indicated by a dash-dotted line.

As the distance D between the mechanical counter stop 143 and the central longitudinal axis of the second bore hole 118 is smaller than the result of the sum of the spacing A between the mechanical stop 141 and the central longitudinal axis of the first bore hole 142, the amount of eccentricity $E_x$, and the radius $r_1$ of the eccentric cylinder 115, minus the radius $r_2$ of the first bore hole 142, the mechanical stop 141 can be pressed against the mechanical counter stop 143. By continuing to turn the eccentric bolt, the material of the load-transmitting member between the mechanical stop 141 and the eccentric cylinder 115 can be put under a compressive force $F_P$ whose magnitude depends on the turning angle of the eccentric bolt. As symbolically indicated, the material of the load-transmitting member which is clamped between the eccentric bolt 112 and the mechanical counter stop 143 acts like a spring and exerts a compressive force $F_P$ on the eccentric cylinder 115. Of course, the eccentric bolt should only be turned so far such that the contact pressure at the contact point P does not become excessive. Preferably, the amount of torque to be used for tightening the eccentric bolt should thus be specified.

The geometric relationships described above and shown in FIG. 6 need to be selected in such a way, and matched to the friction properties of the components engaged with each other, that the connection secured by the eccentric bolt cannot come loose on its own. The compressive force $F_P$, and more specifically its substitute $F_C$, acts at the contact point P between the eccentric cylinder 115 and the first bore hole 142. Due to the geometric situation, the substitute force $F_C$ causes a torque $M_1$, wherein the effective lever arm, referred to as effective eccentricity $E_{Xeff}$, is not the same as the actual eccentricity $E_X$, but is rather the perpendicular distance of the center Z from the line of action of the substitute force $F_C$. Logically, this line of action passes through the centers of the eccentric cylinder 115 and the first bore hole 118, as well as through the contact point P. The friction force $F_R$ which is acting at the contact point P depends on the magnitude of the substitute force $F_C$ and on the friction coefficient $\mu$ which exists at the contact point P. The friction force $F_R$ can resist the torque $M_1$, because the effective lever arm of the counteracting torque $M_2$ corresponds approximately to the radius $r_1$. Based on this geometric situation and the friction coefficient $\mu$, the eccentricity $E_X$ which induces the self-jamming properties of the eccentric bolt, can be determined approximately with the equation:

$$E_X = \mu \times r_1$$

Since friction forces which counteract a spontaneous turning of the eccentric bolt are also present in the bearing sections, there is a sufficient safety margin against an unintended loosening of the connection.

LIST OF REFERENCE SYMBOLS USED HEREIN 100 gravimetric measuring instrument
110 load receiver
111 third bore hole
112 eccentric bolt
113 intermediate part
114 seal ring groove
115 eccentric cylinder
116 first bearing section
117 second bearing section
118 second bore hole
119 fourth bore hole
120 weighing module
121 weighing cell
122 stationary parallel leg
123 movable parallel leg
124 load-transmitting member
125 overload safety spring
126 overload safety stop
127 intermediate support
129 housing
131 base plate
132 fastening location
133 first parallel-guiding member
134 second parallel-guiding member
135 calibrating device
136 calibration weight
137 passage
138 labyrinth baffle seal
139 rod
140 head
141 mechanical stop
142 first bore hole
143 mechanical counter stop
150 positioning element
151 contact spring
152 mounting location
153 elastic seal
155 ejector element
200 application-specific device
A spacing
D distance
P contact point
Y circular path
Z center
$E_X$ eccentricity
$E_{Xeff}$ effective eccentricity
$r_1$ radius of the eccentric cylinder
$r_2$ radius of the first bore hole
$\mu$ friction coefficient
$M_1$ torque
$M_2$ counteracting torque
$F_C$ substitute force
$F_P$ compressive force
$F_R$ friction force Although the invention has been described by presenting specific exemplary embodiments, it is obvious that numerous variants could be created based on a knowledge of the present invention, for example with an eccentric bolt that extends only as far as the central longitudinal axis of the load-transmitting member. Furthermore, the central longitudinal axis of the eccentric bolt does not have to intersect the central longitudinal axis of the load-transmitting member, nor does it have to be orthogonal to the central longitudinal axis of the load-transmitting member. In principle, the range of conceivable solutions includes any position of the eccentric bolt relative to the load-transmitting member that is suitable to force a mechanical stop on the load-transmitting member against a mechanical counter stop that is formed or otherwise resides on the load receiver. Furthermore, diverse means such as sleeves, bore holes, pins, mechanical stops, projections and the like can be used, which are suitable for positioning the load receiver on the load-transmitting member through a form-locking connection. Such positioning elements, when added to the subject of the present invention, are therefore considered to be part of the substance of this invention.

Therefore, while certain exemplary embodiments of the present invention are described in detail above, the scope of the invention is not to be considered limited by such disclosure, and modifications are possible without departing from the spirit of the invention as evidenced by the following claims:

What is claimed is:

1. A gravimetric measuring instrument in the form of a weighing cell having a load-transmitting member adapted for releasable connection to a load receiver, and further comprising:
a mechanical stop residing on the load-transmitting member;
a mechanical counter stop residing on the load receiver; and
an eccentric bolt engaging the load receiver and the load-transmitting member;

wherein rotation of the eccentric bolt causes the mechanical stop to be clamped against the mechanical counter stop, thereby rigidly securing the load receiver to the load-transmitting member.

2. The gravimetric measuring instrument according to claim 1, wherein when the load receiver is in a secured condition, the mechanical stop and the mechanical counter stop lie in a plane that is perpendicular to the direction of the load.

3. The gravimetric measuring instrument according to claim 1, wherein the eccentric bolt has at least one bearing section and at least one eccentric cylinder, said eccentric cylinder arranged with a defined eccentricity relative to the bearing section.

4. The gravimetric measuring instrument according to claim 3, wherein when the load receiver is in a secured condition, a central longitudinal axis of the load-transmitting member and a central longitudinal axis of the bearing section intersect at a right angle.

5. The gravimetric measuring instrument according to claim 3, wherein the load-transmitting member has at least a first bore hole to receive the eccentric cylinder, and the load receiver has at least a second bore hole to receive the bearing section, and wherein the distance between the mechanical counter stop and a central longitudinal axis of the second bore hole is less than the result of subtracting the radius of the first bore hole from the sum of the spacing between the mechanical stop and a central longitudinal axis of the first bore hole, the amount of eccentricity, and the radius of the eccentric cylinder.

6. The gravimetric measuring instrument according to claim 5, wherein when the load receiver is in the secured condition, the effective eccentricity that has been corrected by a leverage ratio, is smaller than the product of the coefficient of friction that exists between the eccentric cylinder and the first bore hole multiplied by the radius of the eccentric cylinder, the leverage ratio depending on the position of the eccentric cylinder within the first bore hole.

7. The gravimetric measuring instrument according to claim 1, wherein the load-transmitting member is comprised of a material of low thermal conductivity.

8. The gravimetric measuring instrument according to claim 1, wherein the material is selected from the group consisting of a polymer and a ceramic material.

9. The gravimetric measuring instrument according to claim 1, wherein the weighing cell and the load receiver are made of an electrically conductive material, and an electrically conductive contact spring is arranged between the weighing cell and the load receiver.

10. The gravimetric measuring instrument according to claim 9, wherein the contact spring is a helical compression spring or a helical tension spring.

11. The gravimetric measuring instrument according to claim 1, wherein the gravimetric measuring instrument includes a housing with a passage, the weighing cell is arranged in the housing, and the load-transmitting member of the weighing cell reaches through said passage.

12. The gravimetric measuring instrument according to claim 11, wherein a contact-free sealing system is arranged between the housing and the load receiver.

13. The gravimetric measuring instrument according to claim 1, wherein the load receiver has a planar surface.

14. The gravimetric measuring instrument according to claim 1, wherein at least one mounting location for the attachment of application-specific devices is provided on the load receiver.

15. The gravimetric measuring instrument according to claim 1, wherein an ejector element is provided to push the eccentric bolt at least partially out of the bore holes during the process of releasing the connection of the load receiver.

16. The gravimetric measuring instrument according to claim 1, wherein the load receiver and the load-transmitting member include positioning elements for the precise alignment of the load receiver and the load-transmitting member in relation to each other.

17. The gravimetric measuring instrument according to claim 1, wherein the mechanical stop is formed on the load-transmitting member.

18. The gravimetric measuring instrument according to claim 1, wherein the mechanical counter stop is formed on the load receiver.

19. A gravimetric measuring instrument in the form of an electrically conductive weighing cell having a load-transmitting member that is comprised of a material of low thermal conductivity and is adapted for releasable connection to an electrically conductive load receiver, the instrument further comprising:
   a mechanical stop residing on the load-transmitting member;
   a mechanical counter stop residing on the load receiver;
   an electrically conductive contact spring arranged between the weighing cell and the load receiver; and
   an eccentric bolt engaging the load receiver and the load-transmitting member, the eccentric bolt designed and located such that rotation thereof causes the mechanical stop to be clamped against the mechanical counter stop, thereby rigidly securing the load receiver to the load-transmitting member.

20. The gravimetric measuring instrument according to claim 19, wherein the contact spring is a helical compression spring or a helical tension spring.

* * * * *

UNITED STATES PATENT AND TRADEMARK OFFICE
CERTIFICATE OF CORRECTION

PATENT NO. : 8,426,753 B2
APPLICATION NO. : 12/839512
DATED : April 23, 2013
INVENTOR(S) : Birrer et al.

Page 1 of 1

It is certified that error appears in the above-identified patent and that said Letters Patent is hereby corrected as shown below:

Title page, item (75) Inventors:, delete "Adrian Birrer, Winterhur (CH)" and insert
-- Adrian Birrer, Winterthur (CH) --.

Signed and Sealed this
Fifth Day of November, 2013

Teresa Stanek Rea
*Deputy Director of the United States Patent and Trademark Office*